Oct. 17, 1944.    P. M. MAGRUDER    2,360,433
STRUCTURAL MEMBER
Filed Oct. 26, 1940    4 Sheets-Sheet 4

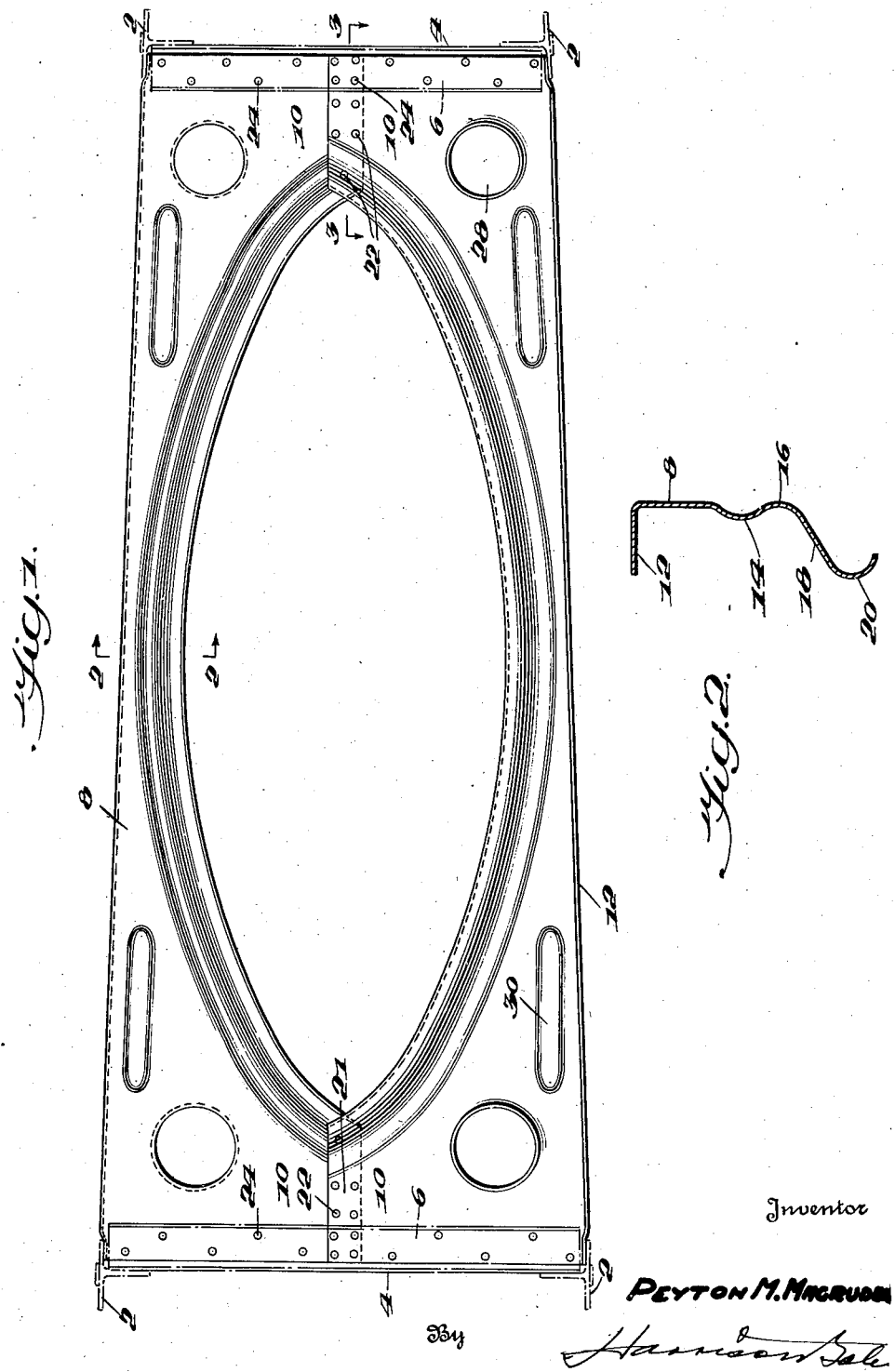

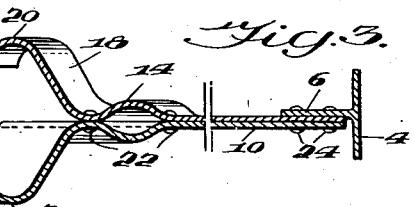
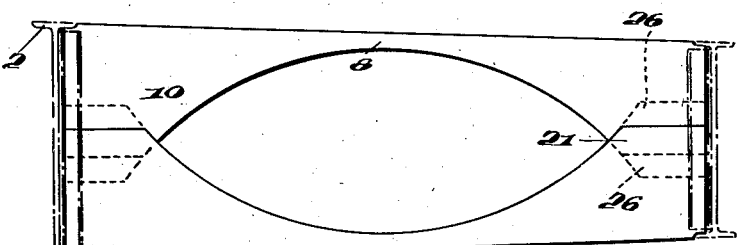
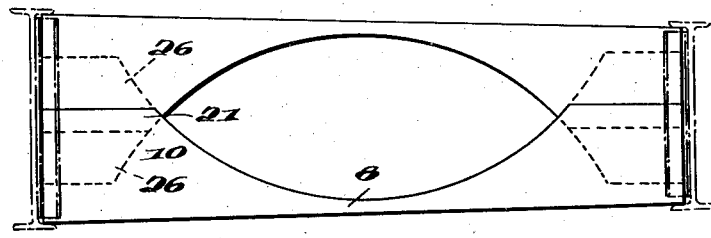
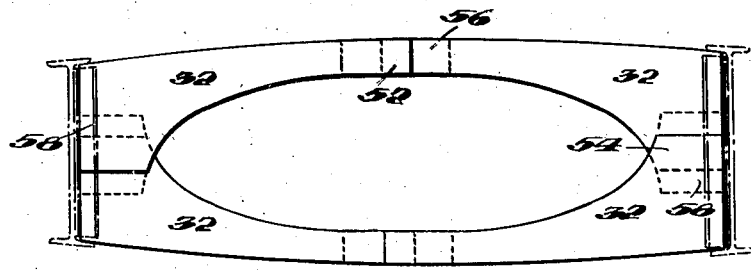
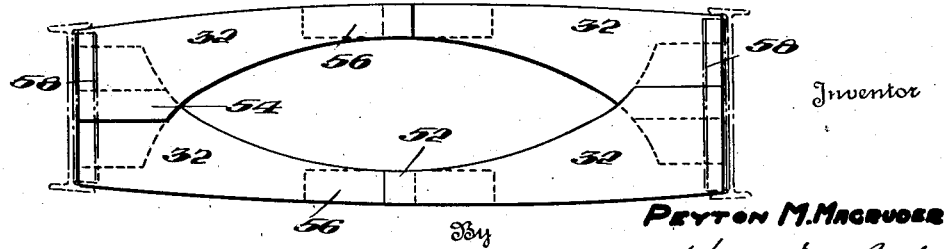

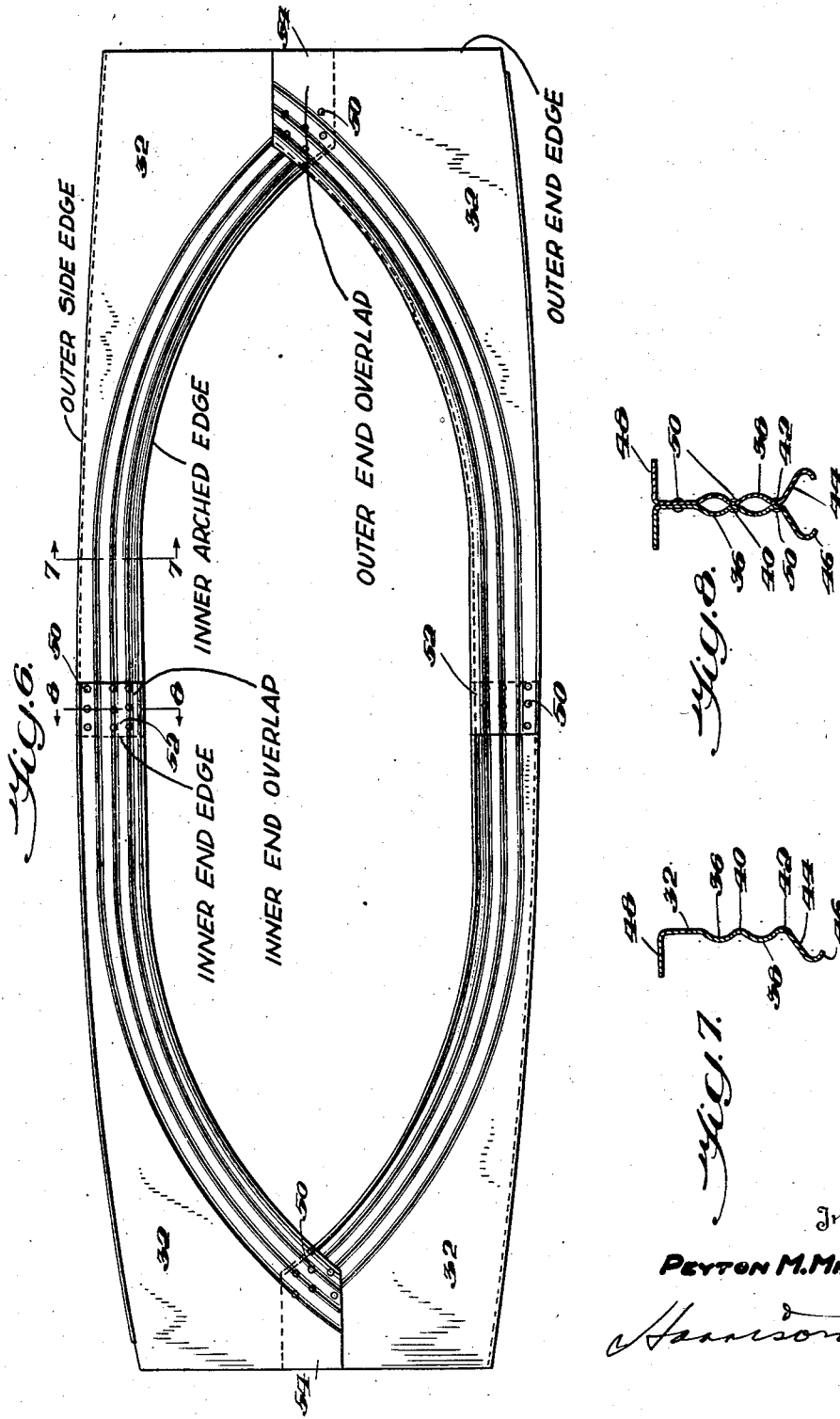

INVENTOR.
PEYTON M. MAGRUDER
BY George Douglas Jones,
ATTORNEY

Patented Oct. 17, 1944

2,360,433

UNITED STATES PATENT OFFICE 2,360,433

STRUCTURAL MEMBER

Peyton M. Magruder, Stoneleigh, Md., assignor to The Glenn L. Martin Company, Baltimore, Md.

Application October 26, 1940, Serial No. 362,939

2 Claims. (Cl. 244—123)

The invention relates to structural elements, and particularly to ribs formed of sheet metal for use in aircraft parts, especially wings and the like.

The usual aircraft wing is formed of a covering of sheet material surrounding and supported by a box beam structure composed of two or more spars extending longitudinally of the wing and arranged one behind the other with ribs extending transversely between and connected to the spars. As the wing normally tapers in thickness, and often in chord or depth, the box beam structure must vary in size, and the ribs therefore each must have different dimensions. This requires the use of a large number of separate dies, one for each rib, and thus greatly increases the cost of manufacture.

The primary object of the present invention is to provide a rib structure such that the ribs produced by a single die can be used at a large number of positions spaced along the wing.

Another object is to produce a rib structure which can be varied in thickness or vertical dimension, so that ribs produced from a single die may be installed at points where the wing is of widely varying thicknesses.

A further object is to produce, by the use of two dies only, ribs which can be used at points in the wing of varying chord and thickness, such ribs then being variable in both horizontal and vertical dimensions.

Still another object is to furnish a rib of this type having high mechanical strength with light weight, this being accomplished by the application of the arch principle to the rib.

Still a further object of the invention is to provide a rib formed of two or more overlapping, arched parts, in which variation in size is obtained by changing the overlap at the ends of the parts and cutting off the unnecessary material.

Further objects and advantages of the invention will be apparent from the accompanying drawings, which form a part thereof.

In the drawings:

Fig. 1 shows in side elevation a rib embodying the invention;

Figs. 2 and 3 are cross-sections on the lines 2—2 and 3—3, respectively, of Fig. 1;

Figs. 4 and 5 show diagrammatically the rib of Fig. 1 reduced in size, these figures also being on a smaller scale than Fig. 1;

Fig. 6 shows in side elevation a modified form of rib embodying the invention;

Figure 11:
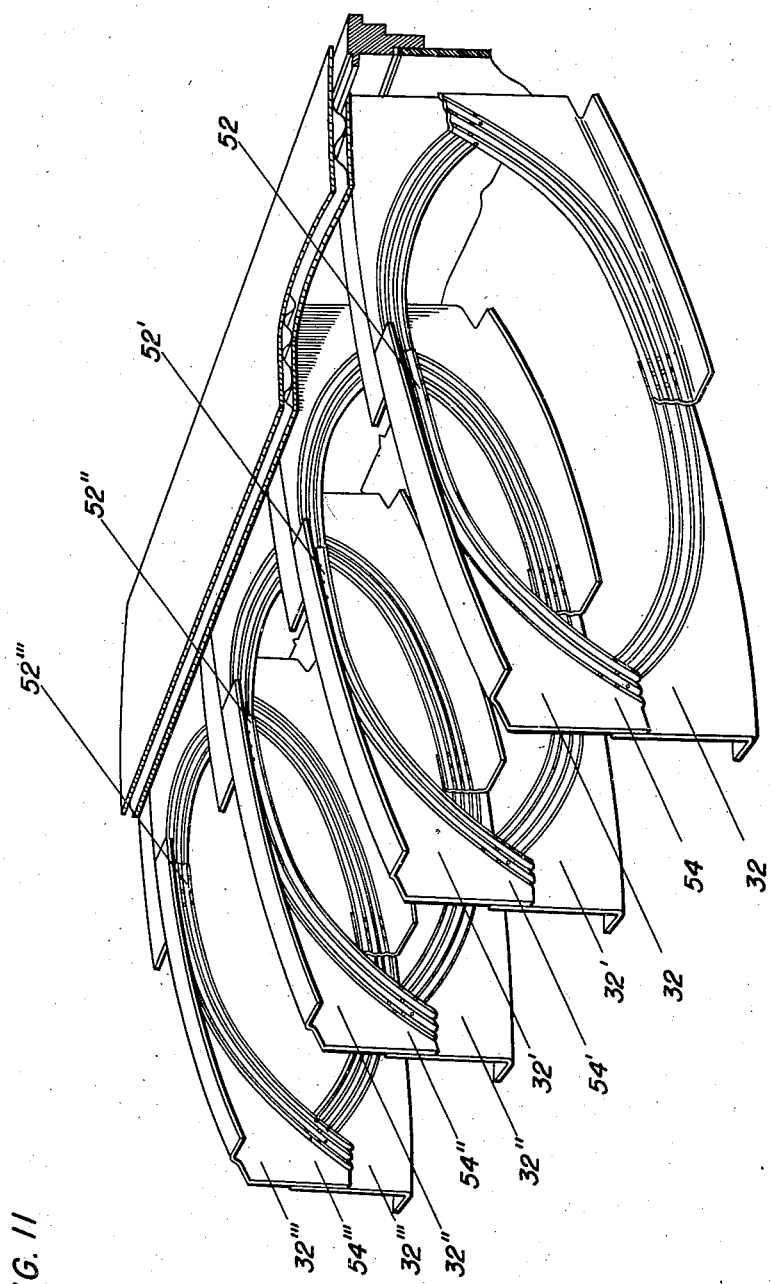

Figs. 7 and 8 are cross-sections on the lines 7—7 and 8—8, respectively, of Fig. 6; and Figs. 9 and 10 show diagrammatically the rib of Fig. 6 reduced in both dimensions, these figures also being on a smaller scale than Fig. 6.

Figure 11 is a perspective view partly in section showing a wing panel with the ribs of varying overlap.

The rib of Figs. 1 to 5 is shown in Fig. 1 as forming part of the box beam of an aircraft wing. This wing has longitudinally extending spar chord members composed of T-shaped spars 2 and connecting angle members provided with extending flanges 6 for receiving the ribs.

The rib is composed from two identical parts formed on the same die. Each part has a flat portion 8 having end portions 10 forming an arched member having a curved edge. The other edge or the outer side edge of the rib part is provided with a strengthening flange 12 which also provides a surface to which a wing skin can be secured. The inner, curved or arched edge is formed, as shown in Fig. 2, with a channel 14, a second portion 16 substantially in the plane of flat portion 8, an inclined flange 18 and a channel 20 at the end thereof. These shaped portions form a strengthening structure which runs along the arched edge.

In forming a rib from two of these rib parts, one is reversed with respect to the other so that the arched edges face one another, or, in other words, so that the inner edges are oppositely arched (see Figs. 1 and 3), and they are then arranged so that their outer ends overlap, as at 21 with the outer edges in substantial alignment. The overlapping outer ends are then secured together by rivets 22 through the flat portions 10 and through the portions 16 which also engage each other. The channels 14 are then turned inwardly towards one another. The flat portions 10 are secured to flanges 6 by rivets 24.

In order to form ribs of lesser vertical dimension, the overlap of the outer ends is increased and any excess may be cut off to prevent unnecessary weight. As shown, for example, in Figs. 4 and 5, progressive increases in the overlap reduce the vertical dimension. In these figures, the portions enclosed in broken lines indicated at 26 designate the end portions which have been cut off. Thus a series of ribs of gradually decreasing height can be produced.

The rib parts may be provided with flanged holes 28 to lighten them and with elongated channels 30 for reinforcement.

Figs. 6 to 10 show a rib formed of four parts which can be varied in chord or length as well as in height. It consists of four similar parts 32. Each part has an inner arched edge forming one-half of a full arch. This arched edge has formed therein channels 36, 38 separated by a portion 40 in the plane of the part 32, a second such portion 42, an inclined portion 44 and a channel 46. The outer side edge of each member has a reinforcing and securing flange 48.

The four parts are arranged in the manner shown in Fig. 6 with the inner ends of the channeled, arched edges overlapping at the top and the bottom of the rib, as shown at 52, and the outer end edges overlapping, as shown at 54, as shown in Fig. 8. The portion 32 and portions 40 and 42 of the parts engage each other and are secured together by rivets 50.

In order to reduce the size of the rib, the overlaps 52 or 54, or both, are increased and the excess material is cut off. Figs. 9 and 10 show successively smaller ribs formed in this manner with increasing overlap in both directions, the cut-off portions being represented by the areas enclosed in broken lines and indicated at 56 and 58, respectively. Obviously, however, the overlap may be varied in one direction only from one rib to the next, if desired.

A wing panel is shown in Figure 11, made in accordance with this invention. Members 32 are arranged in the manner shown in Figure 6, with the ends overlapping as shown at 52 and 54. Members 32', 32'' and 32''' form other similar ribs. The wing panel formed from these ribs is tapered in two directions by varying the degree of overlap at 52', 52'', 52''' and 54', 54'' and 54'''.

While I have described herein some embodiments of my invention, I wish it to be known that I do not intend to limit myself thereby, except within the scope of the appended claims.

I claim:

1. A method of making a tapered airplane wing section having a plurality of ribs of different sizes, comprising forming a plurality of members, each of substantially identical shape and each having an arched edge, securing some of said members together with the arched edges facing one another and portions of the ends of such arched edges overlapping to form a rib, each of said ribs of the section being similarly fabricated but with a progressively greater amount of overlapping of the ends of the edges to effect ribs of smaller chord length and thickness and thereby, a predetermined taper in said wing section.

2. A tapered airplane wing section having a plurality of ribs of different sizes, a rib comprising a plurality of members, each of substantially identical shape having an outer side edge, an inner arched edge, an outer end edge and an inner end edge, said members being secured together with the inner arched edges facing one another and inner ends overlapping with the outer side edges in substantial alignment, and the outer ends overlapping with the outer end edges in substantial alignment, to form the rib; each of said ribs being similarly fabricated but with a progressively greater amount of overlapping of the ends of the members to effect ribs of smaller chord length and thickness and thereby a predetermined taper in said wing section.

PEYTON M. MAGRUDER.